Feb. 6, 1968
R. L. HUTCHESON
3,367,748
PROCESS FOR GROWING HIGH PERFECTION CRYSTALS
Filed Feb. 18, 1964
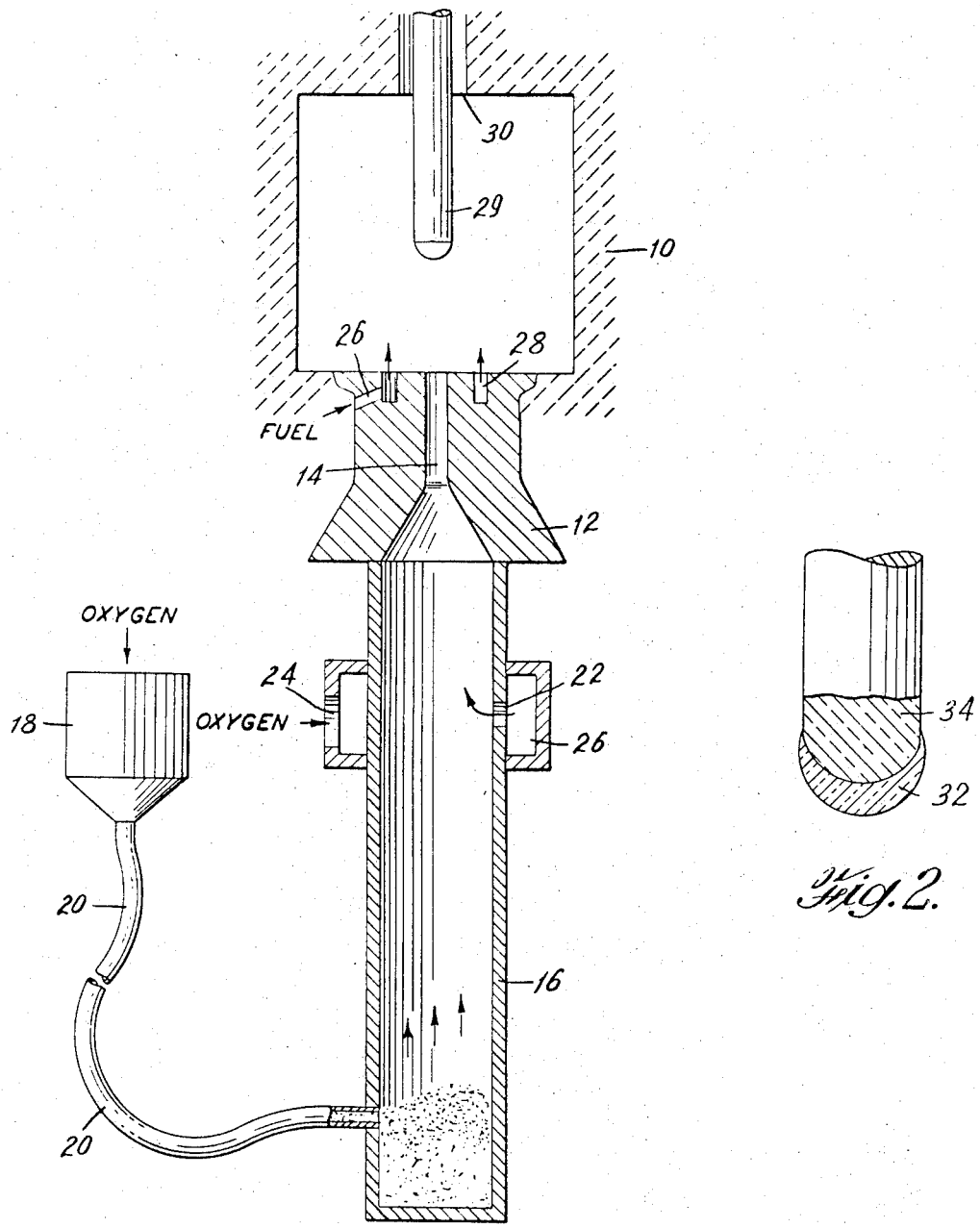
INVENTOR.
RALPH L. HUTCHESON
BY Leo A. Plumij.
ATTORNEY

United States Patent Office 3,367,748
Patented Feb. 6, 1968

3,367,748
PROCESS FOR GROWING HIGH
PERFECTION CRYSTALS
Ralph L. Hutcheson, Gary, Ind., assignor to Union
Carbide Corporation, a corporation of New York
Filed Feb. 18, 1964, Ser. No. 345,758
5 Claims. (Cl. 23—301)

This invention relates to a process and apparatus for producing improved synthetic unicrystalline bodies.

Synthetic sapphires, rubies, and other materials can be produced from boules grown by fusing and accumulating an appropriate material on a support which is exposed to an oxy-hydrogen flame and is progressively moved away from the flame as the boule grows in order to maintain a proper relationship between the point of deposition on the boule and the flame.

Despite continued refinements in the crystal growing process, industry has demanded crystals of greater perfection. For example, ruby crystals needed for use as lasers must be of an exceptionally high perfection with a minimum of misorientation or lineage.

It is the object of this invention, therefore, to provide an improved process and apparatus for growing synthetic crystalline bodies of high perfection.

According to the present invention, powdered constituents of the crystal body to be produced are passed through an upwardly directed oxy-hydrogen flame or other suitable sources of heat to fuse the constituents. The fused constituents are accumulated and crystallized on a crystal seed, preferably in rod form, which overlies the flame. The molten section of the growing crystal, the cap, is maintained in a depending, or downwardly hanging quarter-moon shape whereby superior crystal growth conditions are achieved and a more perfect crystal produced.

It has been found that the occurrence of many crystal imperfections, such as misorientation, are due to a great measure to the shape of the boule cap during crystal growth. In the Verneuil process, wherein powdered alumina, with or without additives, falls through an oxy-hydrogen flame and deposits on a support, a flat, thin molten section is formed during crystal growth. Under these conditions, the cap is very susceptible to minor changes in growth conditions, such as temperature variations, gas flow fluctuations, and so on. High perfection crystals are not easily obtained, therefore, when the molten cap is relatively flat or thin.

Another method of crystal growing employs a spherical or globule-shaped cap. In this type of cap, it has been found, the lineage of the crystal grows toward the center of the growing crystal. The center of the crystal thus has undesirable lineage.

Crystals grown according to the process of this invention utilizing the quarter moon shaped molten cap have less imperfections than those grown by either the flat cap method or spherical cap method described above.

The principles of this invention will be described in detail hereinafter with reference to the accompanying drawings wherein:

FIGURE 1 is a schematic view of one form of apparatus for carrying out the process;

FIGURE 2 is an illustration showing the shape of the boule grown by the process of this invention with the end of the boule in cross-section.

With reference now to FIGURE 1 of the drawings, there is shown a small furnace 10 of heat-resistant material, e.g., alumina. An opening in the lower end of the furnace receives the discharge end of an oxy-hydrogen burner 12, also having a powder feeding nozzle passage 14. Oxygen is supplied to the burner through central conduit 16, and powdered material, such as crystallizable alumina powder, for example, is delivered through conduit 16 in the oxygen stream.

Powder is supplied from hopper 18 in a flow of oxygen carrier gas through conduit 20 and then up the central conduit 16 to the nozzle passage 14 and into the furnace chamber. Oxygen may be passed through conduit 20 without powder by means of suitable arrangements, not shown. Additional oxygen is fed to the central conduit 16 by way of a plurality of inlets 22, the gas being fed to these inlets through inlet 24 and annular space 26. This additional oxygen gas stream aids in insuring a smooth flow of powder through the conduit 16. Fuel gas such as hydrogen is fed to the burner 12 through port 26 into a distribution passage (not shown) and is discharged through burner outlets 28 where the hydrogen and oxygen form a combustible mixture. Nozzle passage 14 has a converging nozzle shape whereby the oxygen and powder streams are shaped and directed upward toward a crystal seed 29.

The crystal seed 29, preferably in the form of a rod as shown, is mounted in such a manner that its free end extends through opening 30 into the furnace. The crystal seed is moveable vertically up and down in the furnace chamber and is also rotatable about the vertical axis. Combustion of the hydrogen and oxygen gas streams takes place within the furnace with the flame and gases passing around the seed rod. Any excess of flame or gas passes out of the top of the furnace through opening 30 or other outlets.

After an initial period of operation in which only the flame is used, the powder flow is started. The powder is a crystallizable constituent of the crystal to be grown. In the case of growing a ruby crystal, a mixture of powdered alumina and powdered chromic oxide are used. The powdered material is fed to the burner in the oxygen carrier gas stream. The powdered material is fused in the flame of the hydrogen fuel gas and the combined oxygen streams, the oxygen carrier gas stream and the additional oxygen stream entering through inlets 22.

According to the process of this invention, the amount of oxygen fed to the burners and carrying the powder thereto is regulated to maintain the molten cap of the growing crystal in the desired quarter-moon shape. The amount of oxygen needed to carry the powder from the hopper 18 to the central passage 16 will vary with the type and size of crystal being grown. This oxygen flow and powder flow in conduit 20 is, therefore, adjusted according to the desired crystal growth rate. The additional oxygen supply through inlets 22 is then increased or decreased to maintain the quarter-moon shape cap on the crystal as described below.

In an example of the process, a ruby crystal one half inch in diameter and four inches long was grown. The crystal had a composition of alumina and 0.03 percent by weight chromic oxide ($Cr_2O_3$) with the crystal C-axis at a 60° angle to the growth axis. This crystal was grown in a furnace of the type illustrated, in the following manner. The burner was lit and the furnace chamber closed and sealed with refractory cement. The hydrogen and oxygen gases were supplied to the burner at an idling total flow rate of not over 20 s.c.f.h. (standard cubic feet per hour) for about 10 minutes as a preheat.

Over the next one-half hour period, the flows of hydrogen and oxygen were increased to a total input of 240 s.c.f.h. at a hydrogen-to-oxygen ratio of 3 to 1. The oxygen flow included 10 s.c.f.h. of carrier gas oxygen from conduit 20. The total hydrogen flow was, therefore, 180 s.c.f.h. and the total oxygen flow was 60 s.c.f.h. These gas flows were maintained until the furnace temperature reached about 1350° C. and then the seed was lowered into growth position and the powder flow initiated.

Over the next one hour period the oxygen carrying the powder was increased from 10 s.c.f.h. to 18 s.c.f.h., decreasing the hydrogen-to-oxygen ratio to below 3 to 1 and providing a hotter flame. The furnace temperature was allowed to increase under these conditions to about 1810° C. over an eight hour period from the start of the powder flow. The crystal was then allowed to grow under steady state conditions for a 32 hour period.

The molten cap on the growing end of the crystal was maintained in the desired quarter-moon shape shown in FIGURE 2. As seen there only the quarter-moon shaped section 32 is molten, the crystal parts 34 above this quarter-moon shaped section 32 having solidified. The maintenance of the quarter-moon shape cap insures that high perfection crystals will be grown for under such conditions, the cap will be thick enough to withstand temperature fluctuations while also producing radially outward lineage.

The quarter-moon shape cap was maintained on the crystal by controlling the amount of oxygen entering through the inlets 22 in the following manner: when the molten cap tended to become too spherical thereby producing the undesirable radially inward lineage growth, the oxygen flow rate was decreased giving a more reducing, lower temperature flame tending to restore the quarter-moon shape cap; and when the molten cap became too flat, the oxygen flow rate was increased slightly giving a more oxidizing, higher temperature flame tending to produce the desired quarter-moon shape cap and the favorable growth conditions.

At the end of the 32 hour period, the crystal growth was terminated by first shutting off the powder and then immediately shutting off all of the gas flows. The crystal was then allowed to cool to room temperature by natural means over a six hour period. Actual crystal growth time was about 35 hours.

The ruby rod grown in the above described example was found to have a higher degree of perfection, as shown in the table below, than a ruby rod grown in the normal manner, i.e., with the flat cap shape resulting from the overhead or normal flame Verneuil method.

*Comparison of ruby rod grown by normal flame Verneuil and present invention*

| | Misorientation | Bubbles, ~1μ dia. | Scattering, μ amps | Index Variations | Threshold, joules | Energy Output 84% R mirror, joules |
|---|---|---|---|---|---|---|
| Normal Flame Verneuil | 30'-3° | Yes | .13 | ~$1 \times 10^{-3}$ | 1,500 | 0.7 |
| Present Invention | 3'-30' | No | 0 | ~$1 \times 10^{-4}$ | 1,475 | 3.1 |

The crystal grown according to the process of this invention is seen to possess a higher degree of perfection than the crystal grown under normal conditions. The "quarter-moon" shape grown crystal has less misorientation, no bubbles, less scattering and index variations, a lower threshold, and a higher energy output.

It has been found, further, that depending on the material of the crystal, the diameter of the crystal body being grown is critical insofar as its ability to sustain the quarter-moon shape cap or molten section is concerned. Thus, when growing an alumina based crystal such as ruby, the diameter of the crystal should be between about one-half inch and one inch. At less than one-half inch diameters, the molten cap becomes spherical, while at diameters greater than one inch, a curved surface is difficult to maintain because of the surface tension of the material.

What is claimed is:

1. A process for growing a synthetic unicrystalline body which comprises passing powdered constituent material through an oxygen-hydrogen flame to fuse the same, directing the flame upwardly onto the surface of a seed crystal disposed above said flame for heating said surface and for depositing thereon fused constituent material, continuing the flame deposition of fused material as the crystal grows by crystallization of the molten material while maintaining the molten portion of the growing crystal in the form, when viewed in cross-section, of a concave-convex quarter-moon shape with the solidus-liquidus interface forming the concave edge of the molten quarter-moon shaped portion by decreasing the oxygen flow to the oxygen-hydrogen flame when the molten portion becomes more spherical than a quarter-moon shape and increasing the oxygen flow to the flame when the molten portion of the growing crystal becomes flatter than a quarter-moon shape.

2. A process as in claim 1 in which a stream of hydrogen in a first stream of oxygen is employed to form the flame, and a second stream of oxygen is employed to carry powdered constituent material through the flame for depositing on the fused crystal surface, and the molten portion of the growing crystal is maintained in the form of the quarter-moon shape by decreasing the flow of the first oxygen stream when the molten portion becomes more spherical than a quarter-moon shape and increasing the flow of the first oxygen stream when the molten portion becomes flatter than a quarter-moon shape.

3. A process as in claim 2 in which the flows of the hydrogen, first oxygen and second oxygen streams are maintained at a $H_2$ to $O_2$ ratio over 2 and up to 3, and the molten portion of the growing crystal is maintained in the form of the quarter-moon shape by increasing the value of the $H_2$ to $O_2$ ratio to decrease the temperature of the flame when the molten portion becomes more spherical than a quarter-moon shape and decreasing the $H_2$ to $O_2$ ratio to increase the temperature of the flame when the molten portion becomes flatter than a quarter-moon shape.

4. A process as in claim 2 in which a synthetic unicrystalline ruby boule is grown with a diameter between one-half and one inch using powdered alumina and chromic oxide as the crystal constituent materials.

5. A process for growing a synthetic unicrystalline alumina boule which comprises burning a stream of hydrogen gas in a first stream of oxygen to form a flame, forming a second stream of oxygen carrying powdered alumina-containing crystal constituent material and introducing the powder carrying oxygen stream into the flame, directing the constituent material carrying flame upwardly onto the surface of a seed crystal disposed above the flame for heating said surface and depositing thereon fused constituent material, withdrawing the seed crystal away from the flame and continuing the flame deposition of fused material as the crystal grows by crystallization of deposited material in cooler, already withdrawn zones of the crystal boule above the deposition area, the flows of the hydrogen, first oxygen and second oxygen streams being at a $H_2$ to $O_2$ ratio of over 2 and up to 3, and maintaining the molten portion of the growing crystal in the form, when viewed in cross section, of a quarter-moon shape, as shown in FIGURE 2 of the drawing, by increasing the value of the $H_2$ to $O_2$ ratio to decrease the temperature of the flame when the molten portion becomes more spherical than a quarter-moon shape and decreasing the $H_2$ to $O_2$ ratio to increase the temperature of the flame when the molten portion becomes flatter than a quarter-moon shape.

References Cited

UNITED STATES PATENTS

| 1,653,022 | 12/1927 | Schmidt. | |
| 2,907,642 | 10/1959 | Rummel | 23—273 X |
| 3,190,727 | 6/1965 | Vunderink | 23—301 X |

FOREIGN PATENTS

| 1,136,308 | 9/1962 | Germany. |
| 80,259 | 3/1952 | Norway. |

OTHER REFERENCES

Halden et al.: Verneuil Crystal Growth in the Arc-Image Furnace, The Review of Scientific Instruments, vol. 34, No. 6, June 1963, pp. 622–626.

NORMAN YUDKOFF, *Primary Examiner.*

G. HINES, *Assistant Examiner.*